United States Patent

Sanitate et al.

[11] Patent Number: 6,164,422
[45] Date of Patent: Dec. 26, 2000

[54] METHOD FOR ASSEMBLING A DISK BRAKE WITH A LACQUER-COATED SEALING RING AND A DISK BRAKE ASSEMBLY

[75] Inventors: Franco Sanitate, Koblenz; Willibrord Conrad, Ochtendung, both of Germany

[73] Assignee: Lucas Industries public limited company, United Kingdom

[21] Appl. No.: 09/309,819

[22] Filed: May 11, 1999

Related U.S. Application Data

[63] Continuation of application No. PCT/EP97/06347, Nov. 13, 1997.

[30] Foreign Application Priority Data

Nov. 15, 1996 [DE] Germany .................. 196 47 434

[51] Int. Cl.[7] .................. F16D 55/18; B21D 53/84
[52] U.S. Cl. .................. 188/72.4; 29/888.3; 277/592; 277/650; 277/935
[58] Field of Search .................. 29/888.3, 527.3; 188/72.4, 367–369; 277/592, 650, 652, 935

[56] References Cited

U.S. PATENT DOCUMENTS

| | | | |
|---|---|---|---|
| 3,154,426 | 10/1964 | Kohnken | 29/527.2 X |
| 3,208,130 | 9/1965 | Zalis et al. | 29/888.3 X |
| 3,359,096 | 12/1967 | Jost | 29/527.2 X |
| 3,550,258 | 12/1970 | Odiorne | 29/527.2 |
| 3,924,314 | 12/1975 | Ferchland | 29/888.3 X |
| 4,531,273 | 7/1985 | Smith et al. | 29/527.2 X |
| 4,575,915 | 3/1986 | Clark et al. | 29/527.2 X |
| 5,364,543 | 11/1994 | Bosna et al. | 29/888.3 X |
| 5,615,479 | 4/1997 | Maeda et al. | 29/888.3 |

FOREIGN PATENT DOCUMENTS

| | | |
|---|---|---|
| 144552 | 6/1985 | European Pat. Off. . |
| 15 04679 | 10/1967 | France . |
| 6806634 | 11/1968 | Germany . |
| 1600008 | 1/1970 | Germany . |
| 3800679 | 1/1989 | Germany . |
| 4004052 | 8/1991 | Germany . |
| 59-58241 | 4/1984 | Japan . |
| 402095317 | 4/1990 | Japan .................. 29/527.2 |
| 1144363 | 3/1969 | United Kingdom . |

OTHER PUBLICATIONS

Von Peter Lonsky, "Die Perfekten Glieter", Techhische Rundschau, 24/90, pp. 76–82.

Vogel Buchverlag, "Fahr Werkechnik: Bremsdynamik Und PKW–Bremsanlagen"1 Aufl. 1991, pp. 212–233.

"Modern Metals" Magazine, May, 1976, pp. 46–47.

Primary Examiner—P. W. Echols
Attorney, Agent, or Firm—MacMillan, Sobanski, & Todd, LLC

[57] ABSTRACT

A brake (10) for a hydraulic vehicle brake system has a housing (14) with a bore (18) which is formed therein and in which a brake piston (20) is received in a sealingly and slideably displaceable manner. The brake piston (20) is adapted to press a brake lining (32) against a brake disk (12) by means of hydraulic pressure. For sealing, the brake piston (20) is sealed off relative to the bore (18) by means of a sealing ring (26) made of elastic material. In order to optimize the adhesive and sliding properties between the sealing ring (26) and brake piston (20), the sealing ring (26) and/or at least that outer surface of the brake piston (20) which cooperates with the sealing ring (26) is coated with a lacquer which contains an organic binder and a solid lubricant.

20 Claims, 6 Drawing Sheets

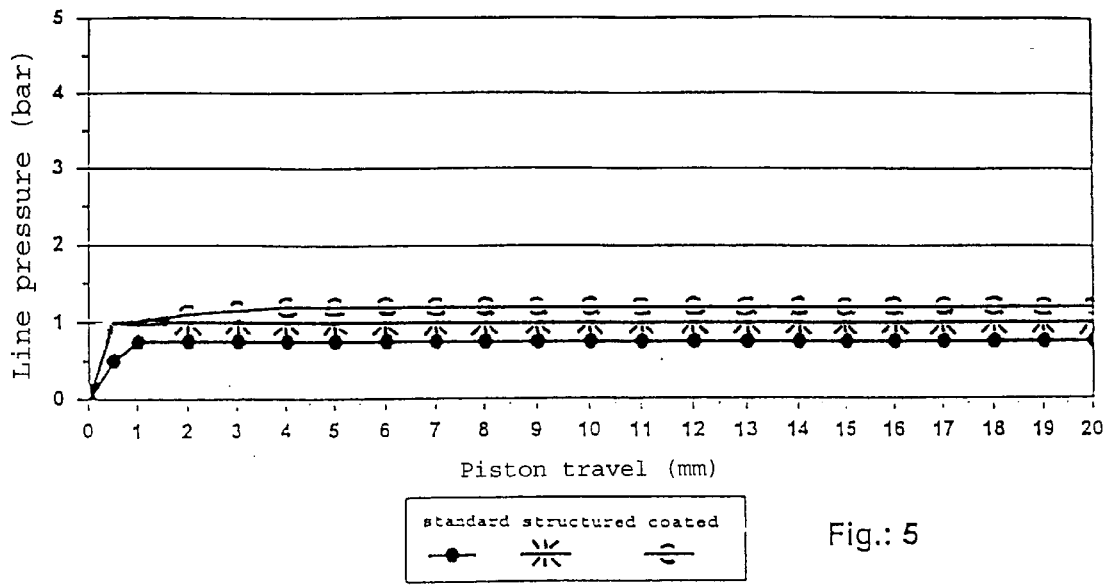

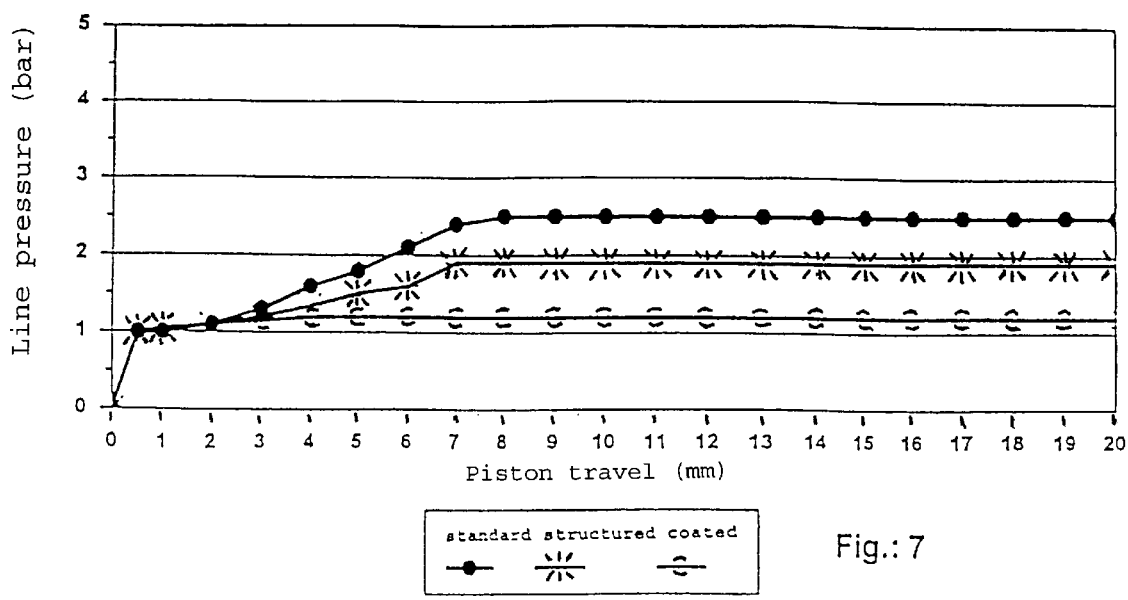
Fig.: 7
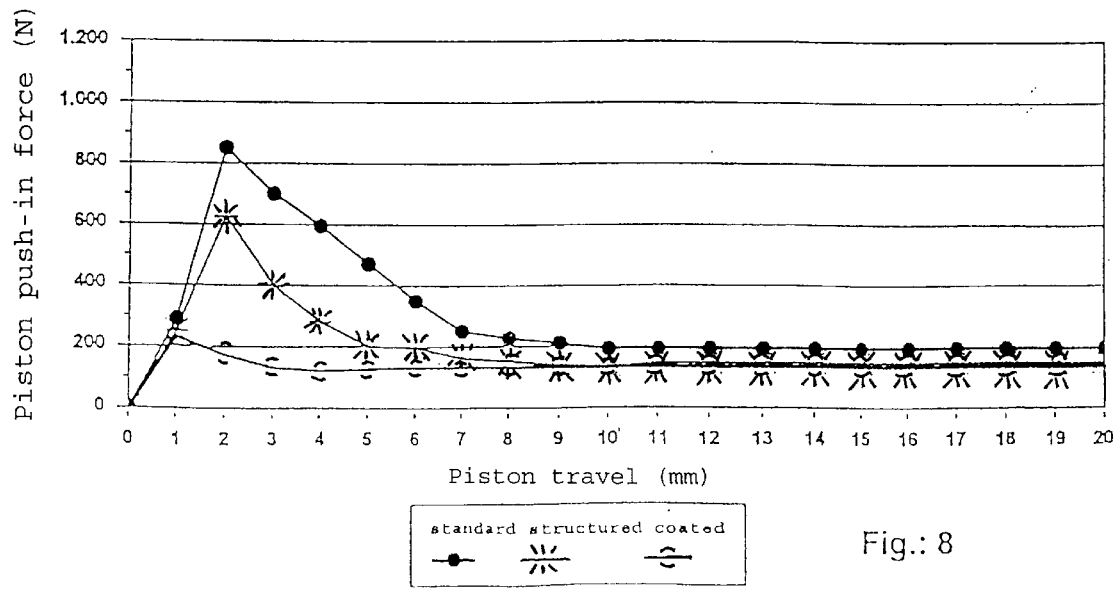
Fig.: 8

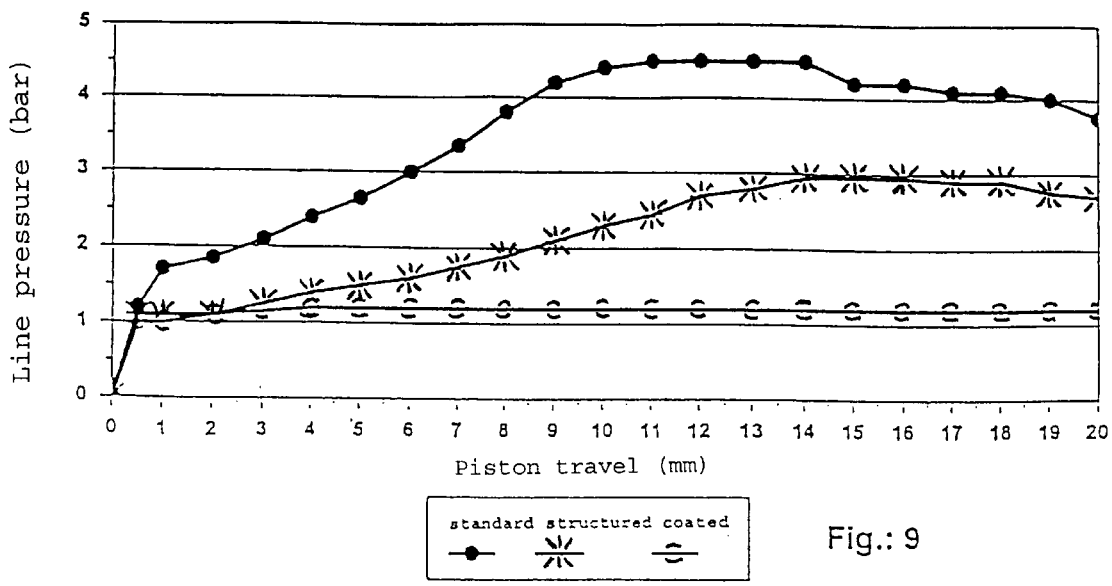
Fig.: 9
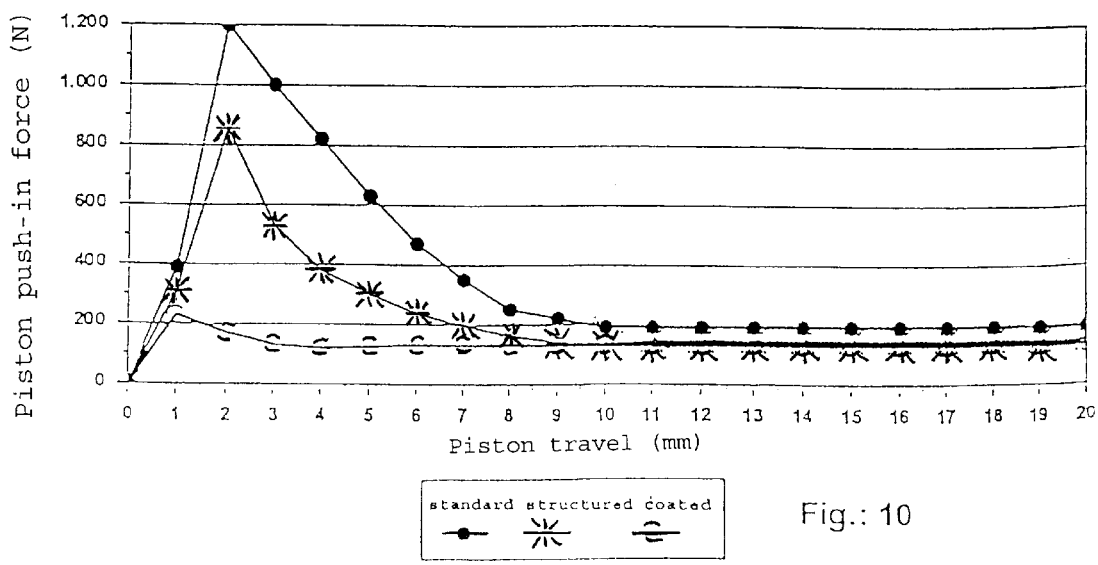
Fig.: 10

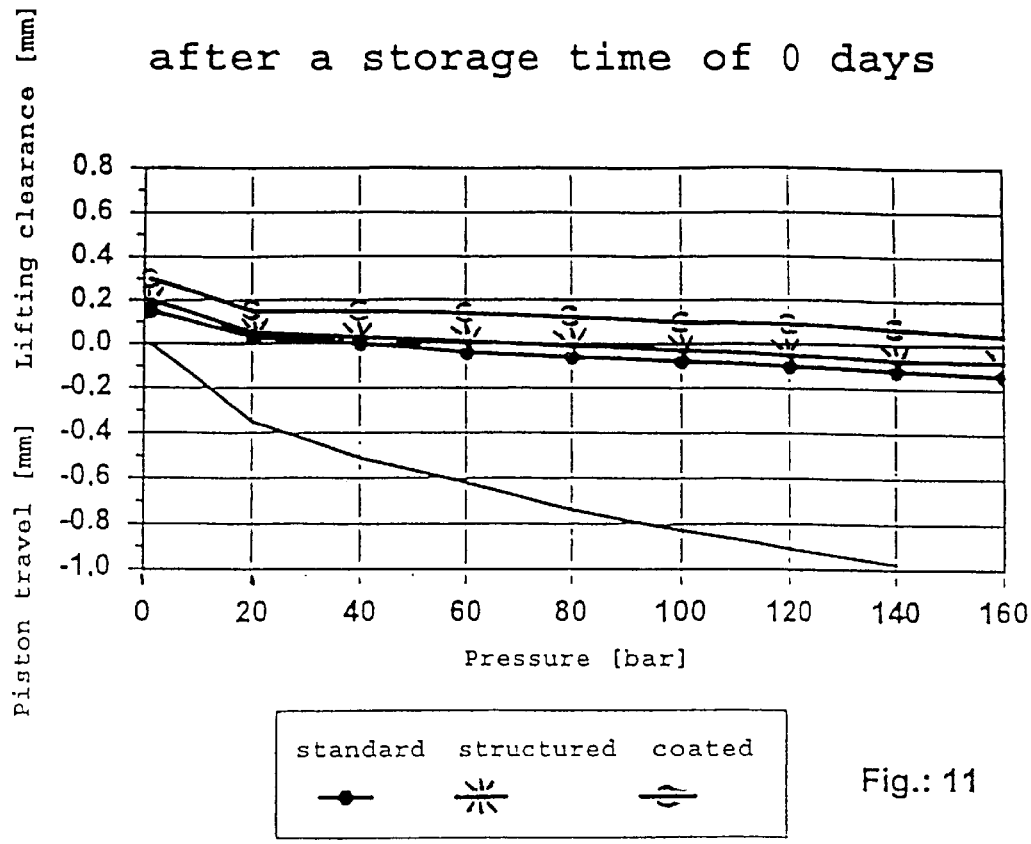
Fig.: 11
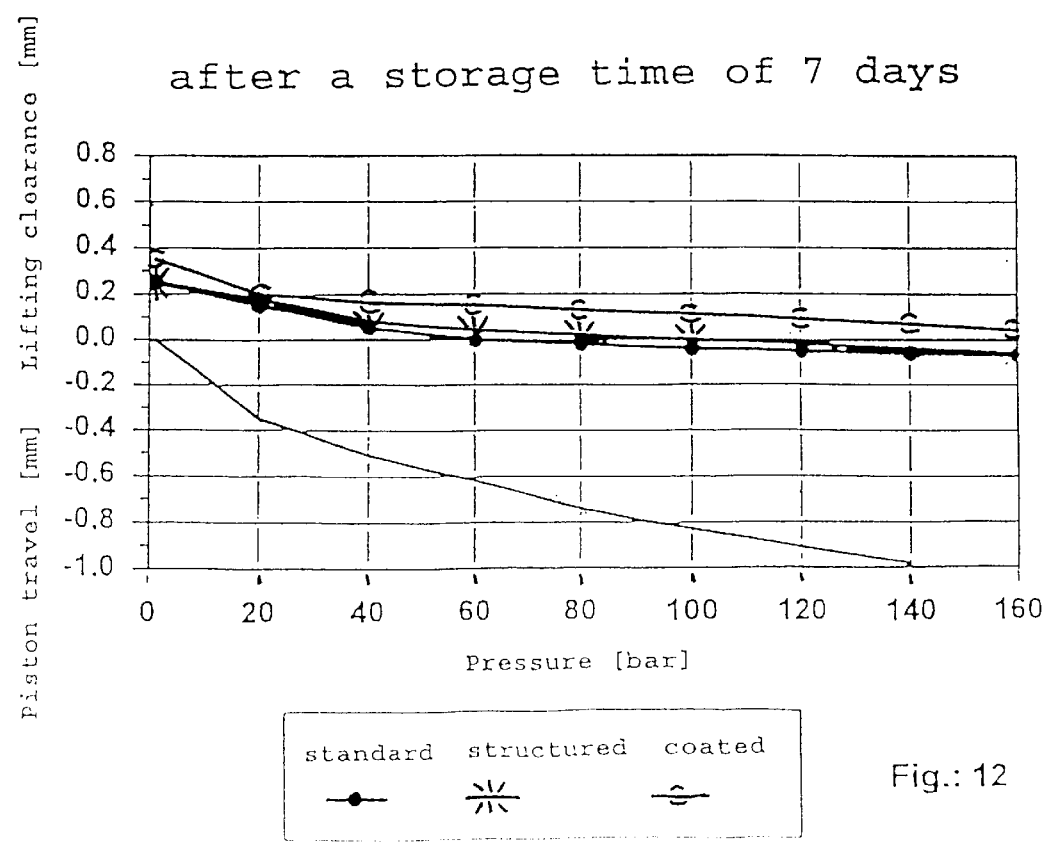
Fig.: 12

METHOD FOR ASSEMBLING A DISK BRAKE WITH A LACQUER-COATED SEALING RING AND A DISK BRAKE ASSEMBLY

This application is a continuation of PCT EP97/06347 filed Nov. 13, 1997.

BACKGROUND OF THE INVENTION

The invention relates to a brake for a hydraulic vehicle brake system according to the pre-characterizing clause of Claim 1, to a sealing ring for such a brake, to a method for producing such a sealing ring and to a method for coating a brake piston.

Hydraulic vehicle disk brakes have at least one piston/cylinder unit, by means of which an associated brake lining, which consists of a lining carrier plate and of a friction lining fastened thereto, can be pressed against the brake disk, in order to brake the rotational movement of a wheel connected to the brake disk. The brake lining is pressed onto the brake disk as a result of the piston being displaced in the direction of the brake disk by means of hydraulic pressure. So that this action functions perfectly, the piston must be sealed off relative to the bore or cylinder, respectively, in which said piston is received. This fluid sealing is conventionally achieved by means of an annular elastomeric seal which is normally held in a groove of the bore or cylinder, respectively, and the radially inner circumferential surface of which bears on the outer surface of the piston. The elastomeric sealing ring mostly has a square or rectangular cross section.

During braking, the piston moves in the direction of the brake disk by means of hydraulic pressure and the elastomeric sealing ring is somewhat taken up by the displacing piston and, as a result of this and of the hydraulic pressure, is somewhat deformed. When the brake is released, that is to say when the hydraulic pressure ceases, the deformed elastomeric sealing ring exerts a return force on the piston and entrains the latter a little distance away from the brake disk. This behavior is plainly desirable, since it resets the brake piston and ensures that, after braking has ended, a so-called lifting clearance is established between the friction lining and the brake disk. Reference is made, in this respect, to German Patent 1,600,008 which describes this behavior in detail. In order to assist the above-described behavior of the elastomeric sealing ring, often even the groove side wall which is located on the brake-lining side and in which the sealing ring is held is slanted, that is to say the groove cross section widens from the groove bottom (see, in this respect, French Patent 1,504,679). So that the sealing ring can reset the brake piston, some adhesion between the cooperating surfaces of the sealing ring and of the brake piston is necessary. If the sliding properties between these surfaces were too good, the piston would be prevented from being reset, since it would be slideably displaced relative to the sealing ring almost immediately, with the result that there would no longer be any deformation of the sealing ring and, consequently, also any resetting force.

On the other hand, under certain circumstances, it is highly desirable for the brake piston to slide relative to the sealing ring. This is the case, for example, when the brake is being assembled. Here, after the sealing ring has been inserted into the cylinder wall groove receiving it, the brake piston has to be pushed into the cylinder. If the piston and sealing ring were unable to slide relative to one another, it would be highly likely that the sealing ring would be twisted in the groove or that it would be damaged and partly sheared off. In certain operating states of the brake, too, however, it is, necessary for the brake piston to slide relative to the sealing ring, for example when the thickness of the friction lining decreases due to wear, so that the brake piston has to be displaced correspondingly further in the direction of the brake disk in order for the friction lining to abut the brake disk. Under such circumstances, the deformability of the elastomeric sealing ring is exceeded, and the piston has to slide relative to the sealing ring in order to assume a new position relative to the latter. Sliding of the brake piston relative to the sealing ring may become necessary even during very sharp braking operations, since then, due to the high forces, the brake housing is widened, the material of the friction lining is compressed, etc., so that a correspondingly longer displacement travel of the brake piston has to be produced.

In order to promote the sliding properties between a brake piston and the elastomeric sealing ring sealing it off, it has long been conventional to soak the sealing ring in an assembling fluid prior to assembly. Sealing rings soaked in this way are inserted into the groove in the cylinder wall of the piston/cylinder unit, and the associated piston can then be pushed readily into the cylinder, without damaging the sealing ring.

However, the use of an assembling fluid also leads to a series of problems. Thus, it is necessary to make sure that the sealing rings do not dwell too long in the assembling fluid. Also, constituents of the sealing rings are dissolved in the assembling fluid, so that the latter has to be changed from time to time. Furthermore, the sealing rings soaked in the assembling fluid must be further processed, that is to say assembled, within a specific period of time. Moreover, when a vehicle brake system is filled with hydraulic fluid for the first time, the assembling fluid may lead to undesirable secondary effects, such as, for example, foaming.

SUMMARY OF THE INVENTION

It is the object of the invention to provide a brake, during the assembly of which the use of assembling fluid may be dispensed with and in which the sliding properties between the brake piston and the elastomeric sealing ring are such that good sliding of the brake piston relative to the sealing ring becomes possible, but without losing the desired resetting property of the sealing ring.

Proceeding from a generic brake, this object is achieved, according to the invention, in that the sealing ring and/or at least the outer surface of the brake piston is coated with a lacquer which contains an organic binder and a solid lubricant. Wax with resins is preferably used as the organic binder. The organic binder serves as a matrix for the solid lubricant and binds the latter.

Preferably, the solid lubricant is one which is based on polytetrafluoroethylene, graphite or molybdenum disulfide.

Particularly preferably, when the brake piston is coated with lacquer, the transitional region between the outer surface and the piston head of the brake piston is also coated with the lacquer.

The lacquer layer applied to the brake piston is preferably baked, in order to increase its stability and, in particular, its abrasion resistance. During baking, it is necessary to ensure that the lacquer layer keeps the desired surface properties, that is to say, in particular, does not become too rough.

The thickness of the lacquer layer is advantageously about 5 $\mu$m to about 15 $\mu$m.

The object mentioned at the beginning is also achieved by means of an elastomeric sealing ring for a vehicle disk brake, said elastomeric sealing ring being coated with a lacquer which contains an organic binder and a solid lubricant. The solid lubricant is preferably based on polytetrafluoroethylene, graphite or molybdenum disulfide. Preferably, the entire sealing ring is coated with the lacquer.

Advantageously, the sealing surface of the sealing ring has pocket-like depressions before the lacquer layer is applied. On the ready-coated sealing ring, this achieves, on the sealing surface of the latter, a solid lubricant repository effect which ensures constant properties of the sealing ring according to the invention over a long period of time.

A preferred method for producing sealing rings coated according to the invention comprises the introduction of elastomeric sealing rings into a drum and the all-round wetting of the introduced sealing rings with a liquid lacquer, which contains an organic binder and a solid lubricant, as a result of the rotation of the drum, the liquid lacquer being located in the drum. Alternatively, the liquid lacquer may also be sprayed into the drum during the rotation of the latter, in order to wet the sealing rings with the lacquer. The production method according to the invention comprises, furthermore, removal of the excess lacquer from the sealing rings by rapidly rotating the drum, draining the excess liquid lacquer out of the drum and drying the sealing rings coated with lacquer. Drying preferably takes place at a temperature of 60 to 70° C.

Waxes with resins are preferably used as the organic binder for the solid lubricant.

Preferably, the liquid lacquer used in the method according to the invention contains a mixture of ester and alcohol as solvent. It has proved beneficial if the liquid lacquer contains up to 20% by weight of organic binder with solid lubricant and about 80% by weight of solvent. As already stated previously, the solid lubricant may be a solid lubricant based on polytetrafluoroethylene, graphite or molybdenum disulfide.

Alternatively, the sealing rings may be coated with lacquer by being laid onto a belt, preferably a conveyor belt, and sprayed with lacquer on this belt. However, this coating method makes it necessary for the sealing rings to be turned over. The sprayed sealing rings may be led on the belt through a belt dryer for drying.

It has proved beneficial, before coating with lacquer, to roughen that sealing surface of each sealing ring which cooperates with the brake piston. Pocket-like depressions are thereby produced in the sealing surface of the sealing ring, and, during coating with lacquer, repositories of solid lubricant are formed in these depressions which ensures constant properties of the sealing according to the invention over a long period of time. Alternatively, the pocket-like depressions may be made as early as during the production of the blanks or semi-finished articles for the sealing rings, in particular by the use of a mold core having a correspondingly designed surface which is reflected in the elastomeric mass when the latter solidifies.

If the brake piston is to be coated with lacquer, according to the invention the lacquer is preferably applied to the brake piston by spraying. The lacquer layer applied to the brake piston is then baked in order to increase its stability and abrasion resistance, wherein the applied lacquer may be dried and baked simultaneously. Preferably, the lacquer layer is baked for half an hour at a temperature of 180° C.

The brake according to the invention provides excellent resetting of the brake piston under a multiplicity of different operating conditions. Thus, in conventional brakes, there is, for example, the problem that the brake piston is no longer reset sufficiently after particularly sharp braking. As mentioned, in the event of sharp braking operations, the brake piston has to slip relative to the sealing ring in order to execute the longer displacement travel required. However, the sealing ring is not capable of resetting the brake piston by the same amount. The result of this is that, even when the brake is released, the friction lining still rubs against the brake disk, the consequence of this being, in addition to increased fuel consumption, that the brake system may overheat and therefore fail.

This problem virtually no longer arises in brakes according to the invention. Although, here too, the sealing ring is not capable of resetting the brake piston over a corresponding distance after sharp braking operations, test results have shown that, when a sealing ring coated according to the invention is used, there is nevertheless a sufficiently large lifting clearance after sharp braking operations, that is to say the friction lining no longer rubs against the brake disk. This is attributable to a good sliding behavior between the sealing ring and the outer surface of the brake piston, but without this impairing the resetting capacity of the sealing ring according to the invention during normal, relatively smooth braking operations.

Brakes according to the invention and sealing rings equipped according to the invention are therefore particularly suitable for coming generations of motor vehicles, in which the fuel saving is of primary significance and where it is therefore important, under all circumstances, to prevent the brake linings from rubbing against the brake disks or other members to be braked. Extrapolations have shown that, by the decrease in the residual rubbing moments, the fuel consumption of a passenger vehicle can be reduced by up to half a liter over one hundred kilometers. In order to achieve a fuel saving of the same order of magnitude by a decrease in the vehicle weight, the latter must be reduced by about 100 kg, which is achievable only with considerable expenditure in terms of construction and materials.

An embodiment of a vehicle brake according to the invention and test data obtained from it are explained in more detail below.

BRIEF DESCRIPTION OF THE DRAWINGS

FIG. 5 shows a graph indicating, for various sealing rings, the hydraulic pressure which is necessary to achieve a specific brake piston displacement travel, the graph relating to a state immediately after the brake has been assembled, FIG. 6 shows a graph relating to the sealing rings according to FIG. 5, which shows the force necessary for resetting the extended brake piston over a specific distance, this graph likewise relating to a state immediately after the brake has been assembled, FIG. 7 shows a graph corresponding to that of FIG. 5, but plotted after a storage time of the assembled brake of three days, FIG. 8 shows a graph corresponding to that of FIG. 6, likewise plotted after a storage time of the brake of three days, FIG. 9 shows another graph corresponding to that of FIG. 5, plotted after a storage time of the brake of seven days, FIG. 10 shows another graph corresponding to that of FIG. 6, likewise plotted after a storage time of the brake of seven days, FIG. 11 shows a graph showing the displacement travel of the brake piston achieved under a specific hydraulic pressure and the lifting clearance achieved after the release of the brake, the data shown in the graph having been obtained immediately after the assembly of the brake, FIG. 12 shows a graph corresponding to that of FIG. 11, plotted after a storage time of the brake of seven days.

DETAILED DESCRIPTION OF THE PREFERRED EMBODIMENTS

Figure 1:
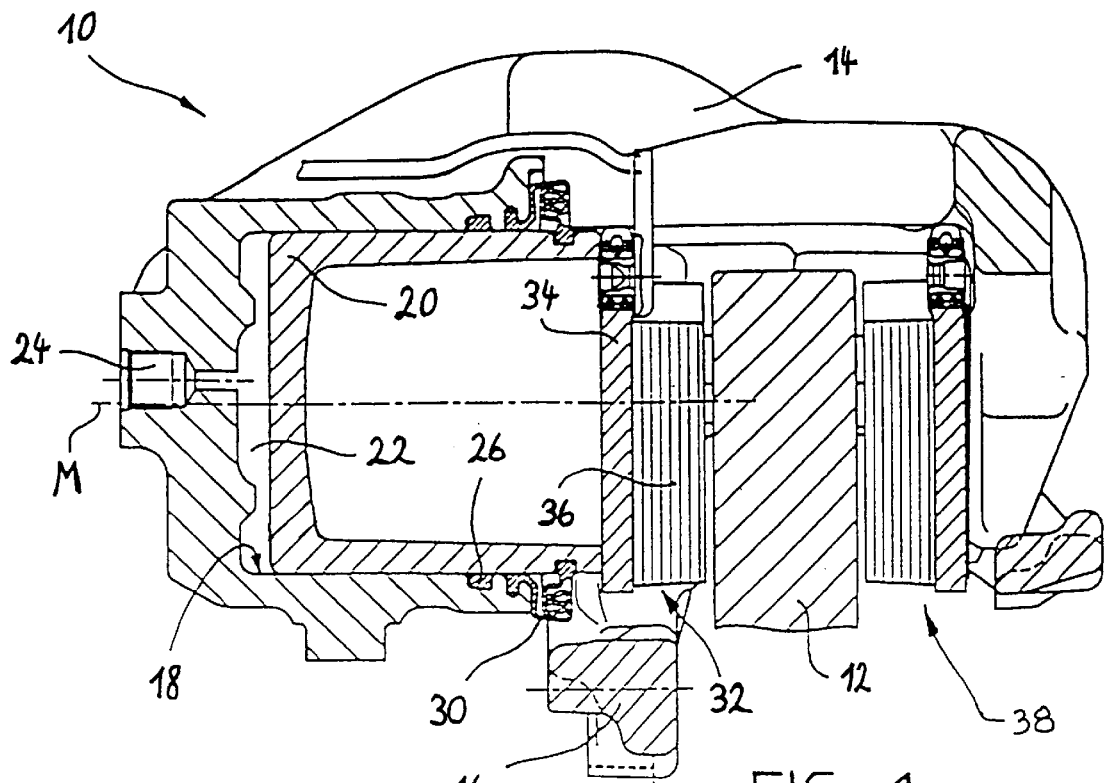
FIG. 1 shows a disk brake according to the invention in section.

FIG. 1 illustrates, in section, the parts of a floating-caliper spot-type disk brake 10 which are important for understanding the present invention. However, the invention can be applied just as well to other disk brake types, for example to a fixed-caliper disk brake.

The disk brake 10 has a brake disk 12 which can rotate about an axis, not illustrated here, and is straddled by a housing 14 designed, here, as a floating caliper. The housing 14 is held, so as to be displaceable, parallel to the axis of rotation of the brake disk 12, on a brake carrier 16 which itself serves for fastening the disk brake 10 to a vehicle.

A bore 18, cylindrical here, the center axis M of which runs parallel to the axis of rotation of the brake disk 12, is formed in the housing 14. A cylindrical brake piston 20, which is designed as a hollow piston, is received in a slideably displaceable manner in the bore 18. The bore 18 and the head 21 of the brake piston 20 together define a chamber 22, into which hydraulic fluid can be introduced through a feed 24.

The brake piston 20 is sealed off in the bore 18 by means of a sealing ring 26 made of elastomeric material and held in an annular groove 28 which is formed near the open end of the bore 18 in the bore wall. A dust boot 30, which likewise consists of elastomeric material and which is secured, on the one hand, in the bore wall and, on the other hand, in a groove 31 on the brake piston 20, ensures that dirt or other undesirable substances, which would cause premature wear of the sliding surface, do not penetrate between the brake piston 20 and the bore wall.

The sealing ring 26 is coated with a lacquer which contains an organic binder and a solid lubricant based on polytetrafluoroethylene. As is evident from FIG. 2, the originally square cross section of the sealing ring 26 is deformed into a rectangular cross section by the brake piston 20. Perfect sealing between the brake piston 20 and the bore 18 is thereby achieved. The cross section of the sealing ring 26 fills the cross section of the annular groove 28 with the exception of a small free space.

Alternatively or additionally, the brake piston 20, more specifically its cylindrical outer surface, is also coated with the above-mentioned lacquer. In this case, the lacquer layer applied, which is baked for better abrasion resistance, also covers the transitional region between the outer surface and the piston head 21 of the brake piston 20, so that it is easily possible for the brake piston to be pushed into the bore 18 when the brake 10 is being assembled. The lacquer layer is thus drawn from the outer surface of the brake piston 20 as far as the edge of the piston head 21. Moreover, in particular, the groove 31, in which the dust boot 30 is held on the brake piston 20, is also coated with the lacquer. This ensures that, with the dust boot 30 mounted, the brake piston 20 can be rotated, without the dust boot 30 being corotated and twisted. This is important in the case of brakes where, for the purpose of changing the brake linings, the brake piston has to be rotated into the cylinder in order to reset the brake piston. This is often the case, for example, in rear wheel disk brakes equipped with parking brakes. In order to assist relative rotatability between the brake piston and dust boot, that part of the dust boot 30 which engages into the groove 31 may additionally be coated with the lacquer.

The brake piston 20 acts with its open end on a brake lining 32 which consists of a lining carrier plate 34 and of a friction lining 36 fastened thereon.

In order to actuate the disk brake 10, pressurized hydraulic fluid is fed to the chamber 22. The brake piston 20 is thereby displaced in the direction of the brake disk 12, so that the brake lining 32 or its friction lining 36, respectively, is brought into abutment with the brake disk 12. After abutment of the brake lining 32 with the brake disk 12, the resulting reaction force causes the housing 14 to be displaced in the opposite direction, with the result that a second brake lining 38, arranged on the other side of the brake disk 12, also abuts the latter. The two brake linings 32 and 38 are guided axially in the brake carrier 16, into which the circumferential forces occurring during braking are also introduced. The functioning of the disk brake 10 illustrated is familiar to any average person skilled in this field and therefore does not need to be explained in any more detail.

Figure 2:
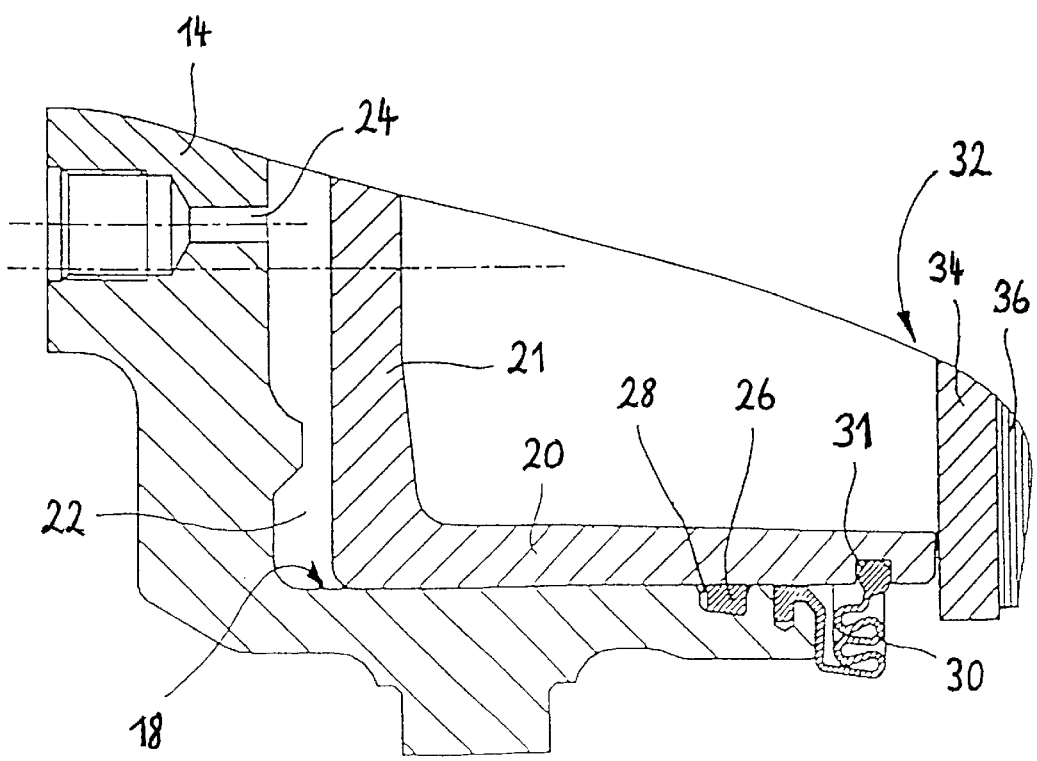
FIG. 2 shows a cut-out from FIG. 1 in an enlarged illustration, the brake being in the released state.
Figure 3:
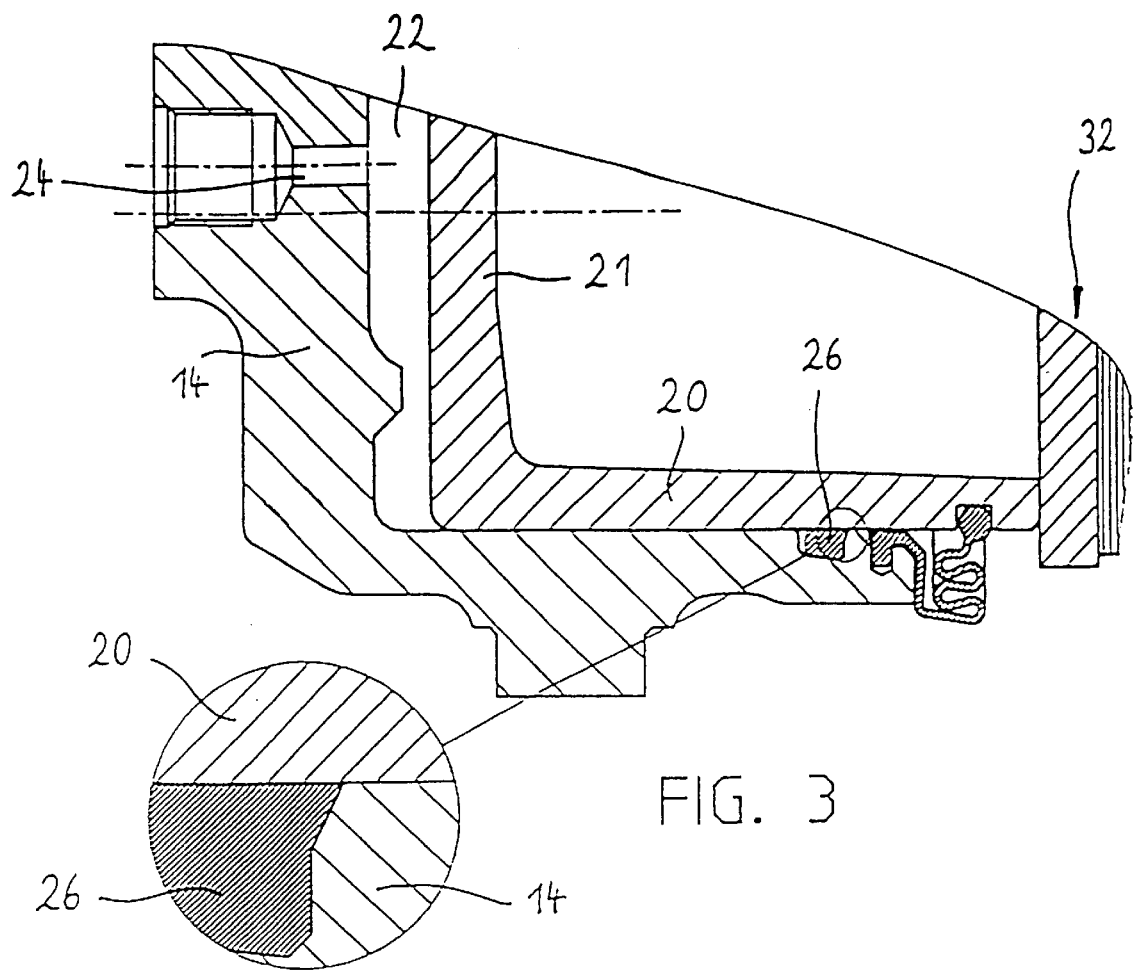
FIG. 3 shows an illustration corresponding to that of FIG. 2, which, however, shows the brake in the actuated state.

It is explained in more detail below, with reference to FIGS. 2 to 4, how the elastomeric sealing ring 26 behaves when the disk brake 10 is actuated and after the end of a braking operation. FIG. 2, in this connection, shows a state in which the brake 10 is released, that is to say inactuated. A small gap is therefore visible between the lining carrier plate 34 and the open end of the brake piston 20.

As already mentioned, when the brake 10 is actuated, the brake piston 20 is first displaced in the direction of the brake disk 12, that is to say out of the bore 18. This displacement, together with the hydraulic pressure acting on the sealing ring 26 through the minimal gap between the cylindrical outer surface of the brake piston 20 and the inner wall of the bore 18, leads to a deformation of the sealing ring 26 (see FIG. 3 in this respect).

Figure 4:
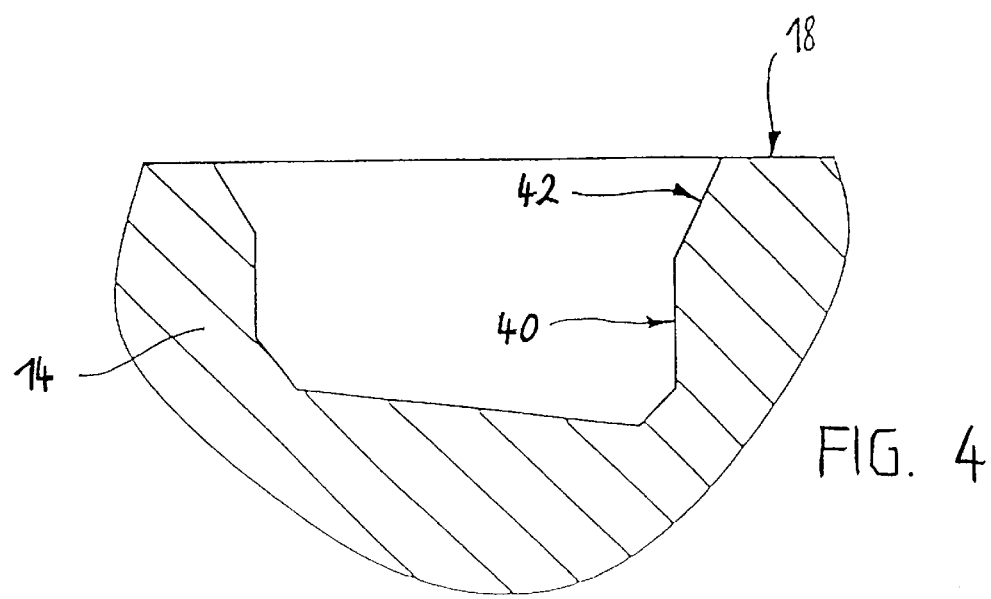
FIG. 4 shows, in cross section, an enlarged illustration of the groove in which the sealing ring is held.

Moreover, the sealing ring 26 first abuts the side wall 40, on the right in FIG. 4, of the groove 28, whereupon the radially inner region of the sealing ring 26 is further deformed and abuts the chamfer 42 which is likewise evident from FIG. 4. The exact shape of the chamfer 42 is fixed by design and depends, inter alia, on whether the brake is a floating-caliper or a fixed-caliper disk brake. In the case of floating-caliper brakes, the chamfer 42 often forms one side of an isosceles triangle.

After the sealing ring 26 has been displaced in the annular groove 28, as described, it may be that the brake piston 20 has already moved so far toward the brake disk 12 that the desired braking action is achieved. Upon subsequent release of the brake, the sealing ring 26 then strives for its original, undeformed shape and therefore draws the brake piston 20 somewhat away from the brake disk 12 back into the bore 18. This normally leads to a small gap, also designated as a lifting clearance, being established between the brake linings 32 and 38 and the brake disk 12.

In the event of sharp braking operations, however, the brake piston 20 must execute a longer travel in the direction of the brake disk 12 in order to achieve the desired high braking action. This travel may amount to up to one millimeter in the case of high hydraulic pressure, for example a pressure of 160 bar. The longer displacement travel of the brake piston 20 is the result of some deformation of the housing 14 occurring under high hydraulic pressure, of friction linings being pressed together, etc. When the brake is released after a sharp braking operation, the friction lining material expands again and the widening of the housing 14 decreases. The brake piston 20 is pressed back into the bore 18 by the forces of the reexpanding friction lining material and of the contracting housing 14, said brake piston slipping relative to the sealing ring 26 in the same way as during preceding actuation.

Many tests have shown that, particularly after braking operations which are so sharp, there is a problem of insufficient lifting clearance. Under some circumstances, the lifting clearance which is established after sharp braking may even assume negative values, that is to say the friction linings still rub against the brake disk 12 even with the brake released, and this may lead not only to increased fuel consumption, but also to overheating of the brake and to other damage.

In order to solve this problem, it has already been proposed for that sealing surface of the sealing ring which cooperates with the brake piston 20 to be given a structured design. A series of diagrams is explained in more detail below, in which a sealing ring structured in this way is compared with an unstructured sealing ring and with a sealing ring 26 coated according to the invention. Thus, FIGS. 5 to 10 show the time-dependent adhesive and sliding behavior of the three different sealing rings. By "standard" is meant the unstructured sealing ring, whilst "coated" refers to the sealing ring according to the invention.

In FIGS. 5, 7 and 9, the hydraulic pressure is plotted which was necessary in order to push a brake piston 20 having a diameter of 54 mm out of the bore 18 over a specific distance (0 to 20 mm). By contrast, in FIGS. 6, 8 and 10, that force is plotted which was necessary in order to push the brake piston 20 back into the bore 18 again over the corresponding distance. Both the unstructured standard sealing ring and the structured sealing ring were mounted, using a conventional assembling fluid. By contrast, the coated sealing ring 26 was mounted without any assembling fluid.

Directly after the brake has been assembled (FIGS. 5 and 6), it is shown that all three sealing rings are located near to one another in terms of their adhesive and sliding properties. A somewhat higher hydraulic pressure is, in general, necessary in order to move the brake piston 20 out of the bore 18 (FIG. 5) when a coated sealing ring 26 is used than when a standard sealing ring is used. The structured sealing ring is located between the two above-mentioned sealing rings. During the return of the brake piston 20 into the bore 18, the three different sealing rings behave in virtually the same way, in all three cases a force of about 200 N is required in order to overcome the static friction and only approximately 150 N is necessary in order to overcome the sliding friction which commences thereafter.

After a storage time of only three days, the three different sealing rings already differ markedly from one another in their adhesive and sliding behavior (FIGS. 7 and 8): whilst the hydraulic pressure necessary for moving the brake piston 20 out of the bore 18 (FIG. 7) is virtually unchanged, as compared with FIG. 5, in the case of the coated sealing ring, a perceptively higher hydraulic pressure has to be applied when a structured sealing ring is used and more than twice as high a hydraulic pressure has to be applied when an unstructured standard sealing ring is used. During the return of the brake piston 20 into the bore 18 after a storage time of three days (FIG. 8), it is shown that, in the case of the coated sealing ring 26, the static friction to be overcome at the commencement of the pushing-in operation is once again virtually identical to the value shown in FIG. 6, whereas, in the case of the structured sealing ring, almost three times the force (approximately 600 N) and, in the case of the unstructured standard sealing ring, about four times the pushing-in force (approximately 850 N) has to be applied. Furthermore, FIG. 8 shows that the fall to the force value necessary for overcoming the sliding friction takes place markedly more slowly with the unstructured standard sealing ring and also with the structured sealing ring than with the coated sealing ring 26.

The differences between the three different sealing rings after a storage time of seven days, (FIGS. 9 and 10) are even more pronounced: considerably higher hydraulic pressure values are necessary, once again, in order to move the brake piston 20 out of the bore 18 in the case of the unstructured standard sealing ring and the structured sealing ring and very high static friction values (structured sealing ring: approximately 850 N; standard sealing ring: 1200 N) also have to be overcome, at the beginning, in order to move the brake piston 20 back into the bore 18. By contrast, the behavior of the coated sealing ring 26 does not measurably differ, even after a storage time of seven days, from the behavior directly after the brake 10 has been assembled.

The lifting clearance which is established, with the brake released, after braking operations of varying sharpness, that is to say different hydraulic pressures, may be inferred from FIGS. 11 and 12. The piston travel over which the piston 20 is moved out of the bore 18 is plotted in millimeters, for an increase in hydraulic pressure, in the lower area of the diagrams shown in FIG. 11 and FIG. 12. The displacement travel is indicated by a negative sign. The upper area of the diagrams shows the lifting clearance which is established after the release of the brake, in relation to each actuating pressure, for the three different sealing rings. All the measurements are related to a zero point of the brake piston 20 which was determined as follows: the brake 10 is assembled together with brake linings 32 and 38 and with the brake disk 12. A 2 mm-thick steel plate is placed between the brake lining 32 and the brake piston 20. The brake 10 is then actuated at a hydraulic pressure of 100 bar, so that the parts of the brake can settle. After a few seconds, the hydraulic pressure is reduced to zero. The steel plate is then removed. The brake piston 20 is subsequently subjected to a hydraulic pressure which is just sufficient to move the piston 20 out of the bore 18 and have the brake lining 32 abut the brake disk 12. This pressure is designated as the abut pressure. It has a value in the range of 1 to 3 bar. The position of the brake piston 20 thus achieved is designated as the zero position. The ordinate zero point in the diagram in accordance with FIGS. 11 and 12 corresponds to this zero position.

After this zero point has been fixed, the hydraulic pressure is reduced to zero. In this case, the brake piston 20 moves somewhat into the bore 18, depending on the seal used, with the result that a lifting clearance is formed. An established lifting clearance of 0.25 mm was determined for the standard sealing ring and the structured sealing ring, whilst the lifting clearance established with the coated sealing ring 26 was 0.35 mm.

The actuating pressures were then increased in steps of 20 bar, the pressure being returned to zero again each time after the respective final pressure was reached.

It may be inferred both on FIG. 11, which shows the behavior directly after assembly, and from FIG. 12, which illustrates the behavior after a storage time of seven days, that, even after actuation with relatively low hydraulic pressure (20 bar), the original lifting clearance is no longer established when the brake is subsequently released. This behavior applies to all three sealing rings investigated and is all the more pronounced, the higher the actuating pressure.

FIG. 11 shows, furthermore, that, directly after the brake has been assembled, negative lifting clearances occur, even after actuation with a hydraulic pressure of about 60 to 80 bar, when the standard sealing ring or the structured sealing ring is used, that is to say the brake piston 20 no longer even reaches its zero position during its movement back into the bore, the result of this being that the brake linings 32 and 38 bear more or less firmly against the brake disk 12. The curves reproducing the lifting clearance run below the zero line in ranges of negative lifting clearance.

After a storage time of seven days (FIG. 12), the situation for the standard sealing ring and also for the structured sealing ring has improved somewhat with regard to negative lifting clearances, but, from an actuating pressure of about 80 bar, negative lifting clearances must still be expected after the brake has been released.

Only the use of the coated sealing ring 26 ensures that positive lifting clearances are achieved, even after actuating pressures of 160 bar, both directly after assembly and after a storage time of seven days.

In contrast to the lifting clearance curves reproduced in FIGS. 11 and 12 for the coated sealing ring, by virtue of its advantageous properties, the initial lifting clearance may be selected to be even smaller, that is to say the point of intersection of the straight line with the abscissa may be shifted somewhat toward lower actuating pressures. A good compromise can thereby be found between the conflicting requirements of a short pedal actuation travel (necessitating as small a lifting clearance as possible) and of a brake which is releasable at all times (necessitating a larger lifting clearance).

What is claimed is:

1. A method for assembling a vehicle disc brake assembly comprising the steps of:
   (a) providing a vehicle disc brake including a housing having a bore formed therein, the bore having an annular groove formed in a side wall thereof;
   (b) providing a brake piston having an outer surface;
   (c) providing an elastomeric sealing ring having an inner surface adapted to bear on the outer surface of the brake piston during the initial assembly of the brake piston in the bore and thereafter during application of the vehicle brake system;
   (d) coating the elastomeric sealing ring with a lacquer to improve the sliding properties of the brake piston relative to the sealing ring to assist in the insertion of the brake piston in the bore during the initial assembly process without losing the resetting property of the sealing ring;
   (e) subsequent to step (d), installing the elastomeric sealing ring in the annular groove of the bore; and
   (f) installing the brake piston in the bore wherein the outer surface of the brake piston bears on the inner surface of the sealing ring.

2. The method according to claim 1 characterized in that the lacquer contains an organic binder and a solid lubricant.

3. The method according to claim 1 characterized in that the lacquer of step (d) is located in a drum or sprayed into a drum containing the sealing ring and the drum is rotated.

4. The method according to claim 3 characterized in that prior to step (e) the step of removing excess lacquer from the elastomeric sealing ring.

5. The method according to claim 4 characterized in that prior to step (e) the steps of removing excess lacquer from the elastomeric sealing ring and drying the elastomeric sealing ring coated with the lacquer.

6. The method according to claim 5 wherein the steps of removing excess lacquer from the elastomeric sealing ring and drying the elastomeric sealing ring coated with the lacquer are performed by rotating the drum.

7. The method according to claim 1 characterized in that the lacquer contains a mixture of ester and alcohol as solvent.

8. The method according to claim 1 characterized in that the lacquer contains up to about 20% by weight of an organic binder with a solid lubricant and to about 80% by weight of solvent.

9. The method according to claim 8 characterized in that the solid lubricant is a solid lubricant based on polytetrafluoroethylene, graphite or molybdenum disulfide.

10. The method according to claim 1 characterized in that prior to step (d), the sealing ring is roughened in order to form pocket-like depressions.

11. The method according to claim 1 characterized in that the sealing ring of step (c) is provided with pocket-like depressions during the production of a blank or semi-finished article for the sealing ring by use of a mold core having a correspondingly designed surface.

12. The method according to claim 1 characterized in that the lacquer layer is dried at a temperature of up to about 110° C.

13. The method according to claim 1 characterized in that the lacquer layer is dried at a temperature in the range from about 60° C. to about 70° C.

14. The method according to claim 1 characterized in that the lacquer defines a lacquer layer having a thickness in the range from about 5 $\mu$m to about 15 $\mu$m.

15. The method according to claim 1 characterized in that prior to step (f) the step of coating at least a portion of the outer surface of the brake piston with a lacquer.

16. The method according to claim 15 characterized in that the lacquer contains an organic binder and a solid lubricant.

17. The method according to claim 15 characterized in that the brake piston is sprayed with the lacquer.

18. The method according to claim 15 characterized in that the lacquer coated brake piston is baked.

19. The method according to claim 18 characterized in that the lacquer coated brake piston is baked for approximately 30 minutes at a temperature of about 180° C.

20. A vehicle disc brake assembly produced according to the method of claim 1.

* * * * *